United States Patent
Luo (10) Patent No.: US 11,452,156 B2
(45) Date of Patent: Sep. 20, 2022

(54) CONFIGURATION SYSTEM, CLIENT DEVICE, EMBEDDED DEVICE CONFIGURATION METHOD, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Zhenghu Luo, Beijing (CN)

(73) Assignees: CHINA MOBILE COMMUNICATION CO., LTD. RESEARCH INST, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 147 days.

(21) Appl. No.: 16/959,563

(22) PCT Filed: Dec. 28, 2018

(86) PCT No.: PCT/CN2018/125041
§ 371 (c)(1),
(2) Date: Jul. 1, 2020

(87) PCT Pub. No.: WO2019/134595
PCT Pub. Date: Jul. 11, 2019

(65) Prior Publication Data
US 2021/0084703 A1 Mar. 18, 2021

(30) Foreign Application Priority Data
Jan. 2, 2018 (CN) .......................... 201810000714.0

(51) Int. Cl.
*H04W 4/00* (2018.01)
*H04W 76/15* (2018.01)
(Continued)

(52) U.S. Cl.
CPC .......... *H04W 76/15* (2018.02); *H04W 76/14* (2018.02); *H04W 84/12* (2013.01); *H04W 88/04* (2013.01); *H04W 92/08* (2013.01)

(58) Field of Classification Search
None
See application file for complete search history.

(56) References Cited

U.S. PATENT DOCUMENTS 9,503,636 B2 * 11/2016 Brockway, III .... H04N 5/23206
9,900,919 B1 * 2/2018 Butler ............... H04W 52/0245
(Continued)

FOREIGN PATENT DOCUMENTS

| CN | 103813473 A | 5/2014 |
| CN | 105245574 A | 1/2016 |
| CN | 106535288 A | 3/2017 |

OTHER PUBLICATIONS

International Search Report dated Mar. 12, 2019 in corresponding PCT Application No. PCT/CN2018/125041.
(Continued)

*Primary Examiner* — Bob A Phunkulh
(74) *Attorney, Agent, or Firm* — Syncoda LLC; Feng Ma (57) ABSTRACT

The present disclosure discloses a configuration system, comprising: a client device, an embedded device, and a router. The client device is configured to establish a first connection with the embedded device in a point-to-point wireless connection mode, acquire access information of the router, and send the access information to the embedded device. The embedded device is configured to establish, according to the access information, a second connection
(Continued)

with the router in a Wi-Fi mode while maintaining the first connection with the client device. The present disclosure also discloses a client device, an embedded device configuration method, and a computer readable storage medium.

14 Claims, 7 Drawing Sheets

(51) Int. Cl.
*H04W 76/14* (2018.01)
*H04W 84/12* (2009.01)
*H04W 88/04* (2009.01)
*H04W 92/08* (2009.01)

(56) References Cited

U.S. PATENT DOCUMENTS

| | | | |
|---|---|---|---|
| 10,159,101 B2 | 12/2018 | Barrett et al. | |
| 10,278,152 B2* | 4/2019 | Kim | H04W 60/00 |
| 2013/0081113 A1* | 3/2013 | Cherian | H04L 63/062 |
| | | | 726/4 |
| 2014/0181943 A1* | 6/2014 | Arashin | H04W 12/50 |
| | | | 726/7 |
| 2014/0369232 A1* | 12/2014 | Kim | H04W 8/005 |
| | | | 370/254 |
| 2015/0138991 A1* | 5/2015 | Timariu | H04W 88/04 |
| | | | 370/241 |
| 2016/0227474 A1* | 8/2016 | McRae | H04W 48/20 |
| 2016/0242030 A1* | 8/2016 | Pang | H04L 9/0863 |
| 2017/0181047 A1* | 6/2017 | Cai | H04W 36/03 |
| 2017/0339727 A1 | 11/2017 | Barrett et al. | |
| 2018/0109999 A1* | 4/2018 | Finnegan | H04W 52/02 |
| 2018/0199265 A1 | 7/2018 | Liu et al. | |
| 2018/0255611 A1* | 9/2018 | Li | H04W 92/18 |
| 2020/0059915 A1* | 2/2020 | Lee | H04W 72/02 |
| 2021/0352736 A1* | 11/2021 | Hong | H04W 12/0431 |
| 2021/0377067 A1* | 12/2021 | Hong | H04W 40/24 |

OTHER PUBLICATIONS

Written Opinion of the International Searching Authority dated Mar. 12, 2019 in corresponding PCT Application No. PCT/CN2018/125041.

* cited by examiner

CONFIGURATION SYSTEM, CLIENT DEVICE, EMBEDDED DEVICE CONFIGURATION METHOD, AND STORAGE MEDIUM

CROSS-REFERENCE TO RELATED APPLICATION

This application is a U.S. National Phase of PCT International Application No, PCT/CN2018/125041 with an International Filing Date of Dec. 28, 2018, which claims under 35 USC § 119(a) the benefit of Chinese Patent Application No. 201810000714.0, filed on Jan. 2, 2018, the entire contents of which are incorporated by reference herein.

TECHNICAL FIELD

The disclosure relates to the technical field of wireless communications, and in particular to a configuration system, a client device, a method for configuring an embedded device, and a computer-readable storage medium.

BACKGROUND

With the progress of science and technology and the improvement of people's living standards, a way that embedded devices use wired access for network configuration has been unsatisfied for the user. For the convenience of users, many embedded devices, such as home gateways, smart home devices, Internet of Things devices and industrial devices, are no longer limited to configuring the network through wired access modes, but can configure the network through Wireless Local Area Networks (WLAN).

These embedded devices generally do not have an input/output interface such as a screen or keyboard, and their network configuration is generally divided into two stages.

In the first stage, the embedded device provides a separate WLAN Access Point (AP), and a Service Set Identifier (SSID) generally begins with a specific character string. After client devices (such as a Personal Computer (PC) and a smart phone) are connected to a Wireless Fidelity (Wi-Fi) network of the AP, the corresponding software of the client devices uses specific protocols (like a Hyper Text Transfer Protocol (HTTP)) of the embedded device to connect with the embedded device, and performs a connection configuration operation with a wireless router.

In the second stage, the embedded device may switch to a Wi-Fi Station mode after being configured by the corresponding software of the client device, and access to the wireless router in the environment, at the moment, the client device also switches to the wireless router. In this way, the embedded device and the client device are in the same WLAN, thereby realizing the network configuration of the embedded device. Then, the corresponding software of the client device may communicate with the embedded device through a specific protocol and use related services.

However, since it takes a long time for the embedded device to switch from the AP mode to the Station mode, this network configuration method has disadvantages such as low speed and low efficiency of network distribution.

SUMMARY

To solve related technical problems, the embodiments of the disclosure provide a configuration system, a client device, a method for configuring an embedded device, and a computer-readable storage medium.

A technical solution of the disclosure is implemented as follows.

The embodiments of the disclosure provide a configuration system, which includes: a client device, an embedded device and a router.

The client device is configured to establish a first connection with the embedded device in a point-to-point wireless connection mode, acquire access information of the router, and send the access information to the embedded device.

The embedded device is configured to establish, based on the access information, a second connection with the router in a Wi-Fi mode while maintaining the first connection with the client device.

In the above solution, the embedded device is further configured to feed back a progress of accessing the router to the client device in real time, and feed back a result of accessing the router when the accessing ends.

In the above solution, the client device is configured to: establish, according to a received selection instruction for an embedded device, a first connection with the selected embedded device in the point-to-point wireless connection mod; or, acquire identification information of an embedded device, and establish, according to the identification information of the embedded device, a first connection with the corresponding embedded device in the point-to-point wireless connection mode.

In the above solution, the client device is configured to acquire the access information according to a received operation instruction for the router.

In the above solution, the client device is configured to: acquire identification information of the router; establish, based on the identification information of the router, a third connection with the router in the point-to-point wireless connection mode while maintaining the first connection with the embedded device; and receive the access information from the router when the router allows an embedded device corresponding to identification information sent by the client device to access.

In the above solution, the router is configured to determine whether to allow embedded devices corresponding to identification information sent by the client device to access, and in response to determining to allow a target embedded device to access, send identification information of the target embedded device to the client device; the target embedded device is the one allowed to access among the embedded devices corresponding to the identification information sent by the client device.

The client device is configured to receive the identification information of the target embedded device from the router, and send the access information to the corresponding target embedded device based on the identification information of the target embedded device.

The target embedded device is configured to establish, based on the access information, the second connection with the router in the Wi-Fi mode while maintaining the first connection with the client device.

In the above solution, when the point-to-point wireless connection mode includes a Wi-Fi Direct mode or a Bluetooth connection mode, the configuration system includes multiple embedded devices. In the configuration system, the client device is a host device in a group, and the multiple embedded devices and the router are client devices in the group.

The embodiments of the disclosure also provide a client device, which includes: a processor and a memory configured to store a computer program executable by a processor.

When running the computer program, the processor is configured to perform the following operations.

The first connection is established with the embedded device in the point-to-point wireless connection mode.

The access information of the router is acquired.

The access information is sent to the embedded device. The access information is to instruct the embedded device to establish the second connection with the router in the Wi-Fi mode while the first connection with the client device is maintained.

In the above solution, when running the computer program, the processor is further configured to perform the following operations.

According to a received selection instruction for an embedded device, a first connection is established with the selected embedded device in the point-to-point wireless connection mode; or identification information of an embedded device is acquired, and according to the identification information of the embedded device, a first connection is established with the corresponding embedded device in the point-to-point wireless connection mode.

In the above solution, when running the computer program, the processor is further configured to perform the following operation.

According to a received operation instruction for the router, the access information is acquired.

In the above solution, when running the computer program, the processor is further configured to perform the following operations.

Identification information of the router is acquired.

Based on the identification information of the router, a third connection is established with the router in the point-to-point wireless connection mode while the first connection with the embedded device is maintained.

If the router allows the embedded device corresponding to the identification information sent by the client device to access, the access information sent by the router is received.

In the above solution, when running the computer program, the processor is further configured to perform the following operation.

If the router allows embedded devices corresponding to identification information sent by the client device to access, according to the identification information of the target embedded device sent by the router, the access information is sent to the corresponding target embedded device, so that the access information instructs the target embedded device to establish the second connection with the router in the Wi-Fi mode while maintaining the first connection with the client device.

The embodiments of the disclosure also provide a client device, which includes: a connecting module, an acquiring module and a sending module.

The connecting module is configured to establish a first connection with an embedded device in a point-to-point wireless connection mode.

The acquiring module is configured to acquire access information of a router.

The sending module is configured to send the access information to the embedded device. The access information is used for instructing the embedded device to establish a second connection with the router in the Wi-Fi mode while maintaining the first connection with the client device.

The embodiments of the disclosure also provide a method for configuring an embedded device, which includes the following operations.

The client device establishes a first connection with an embedded device in a point-to-point wireless connection mode.

The client device acquires access information of a router.

The client device sends the access information to the embedded device. The access information is used for instructing the embedded device to establish a second connection with the router in a Wi-Fi mode while maintaining the first connection with the client device.

In the above solution, when the access information instructs the embedded device to establish the second connection with the router in the Wi-Fi mode while maintaining the first connection with the client device, the method further includes the following operation.

The embedded device feeds back a progress of accessing the router to the client device in real time, and feeds back a result of accessing the router when the accessing ends.

In the above solution, the operation that the client device establishes the first connection with the embedded device in the point-to-point wireless connection mode includes the following operations.

According to a received selection instruction for an embedded device, the client device establishes a first connection with the selected embedded device in the point-to-point wireless connection mode; or the client device acquires identification information of an embedded device, and establishes, based on the identification information of the embedded device, a first connection with the corresponding embedded device in the point-to-point wireless connection mode.

In the above solution, the operation that the client device acquires the access information of the router includes the following operation.

The client device acquires the access information according to a received operation instruction for the router.

In the above solution, the operation that the client device acquires the access information of the router includes the following operations.

The client device acquires identification information of the router.

According to the identification information of the router, the client device establishes a third connection with the router in the point-to-point wireless connection mode while maintaining the first connection with the embedded device.

If the router allows an embedded device corresponding to identification information sent by the client device to access, the client device receives the access information from the router.

In the above solution, when the client device receives the access information from the router, the method further includes the following operation.

The client device receives identification information of a target embedded device sent by the router; the target embedded device is the one, determined by the router to be allowed to access, among embedded devices corresponding to identification information sent by the client device.

Correspondingly, the operation that the client device sends the access information to the embedded device includes the following operation.

According to the identification information of the target embedded device, the client device sends the access information to the corresponding target embedded device, so that the access information instructs the target embedded device to establish the second connection with the router in the Wi-Fi mode while maintaining the first connection with the client device.

In the above solution, when the point-to-point wireless connection mode includes the Wi-Fi Direct mode or the Bluetooth connection mode, the configuration system includes multiple embedded devices. In the configuration system, the client device is a host device in a group, and the embedded device and the router are client devices in the group.

The embodiments of the disclosure also provide a computer-readable storage medium having stored therein computer-executable instructions that, when executed by a processor, cause the processor to perform the method for configuring the embedded device.

The embodiments of the disclosure provide the configuration system, the client device, the embedded device configuration method and the computer-readable storage medium. The client device in the configuration system establishes the first connection with the embedded device in the configuration system in the point-to-point wireless connection mode; the client device acquires the access information of the router in the configuration system, and sends the access information to the embedded device; and the embedded device establishes, based on the access information, the second connection with the router in the Wi-Fi mode while maintaining the first connection with the client device. In the embodiments of the disclosure, by combining the Wi-Fi configuration mode with the point-to-point wireless connection mode, the embedded device may establish the second connection with the router in the Wi-Fi mode while establishing the first connection with the client device in the point-to-point wireless connection mode, so that the embedded device has no need to switch from the AP mode to the Station mode in the configuration process, which can greatly shorten the configuration time of the embedded device and improve the configuration speed and efficiency.

BRIEF DESCRIPTION OF THE DRAWINGS

In the accompanying drawings (not necessarily drawn to scale), the similar reference signs may describe the similar parts in different views. The similar reference signs with different suffix letters may represent different examples of the similar parts. The accompanying drawings generally show, by example rather than by limitation, the embodiments discussed in the present application.

DETAILED DESCRIPTION

The disclosure is further described below in combination with the accompanying drawings and embodiments.

In the embodiments of the disclosure, a client device in a configuration system establishes a first connection with an embedded device in the configuration system in a point-to-point wireless connection mode; the client device acquires access information of a router in the configuration system, and sends the access information to the embedded device; and the embedded device establishes, based on the access information, a second connection with the router in a Wi-Fi mode while maintaining the first connection with the client device. In the embodiments of the disclosure, by combining the Wi-Fi configuration mode with the point-to-point wireless connection mode, the embedded device may establish the second connection with the router in the Wi-Fi mode while establishing the first connection with the client device in the point-to-point wireless connection mode, so that the embedded device has no need to switch from an AP mode to a Station mode during the configuration process, which can greatly shorten the configuration time of the embedded device and improve the configuration speed and efficiency.

Figure 1:
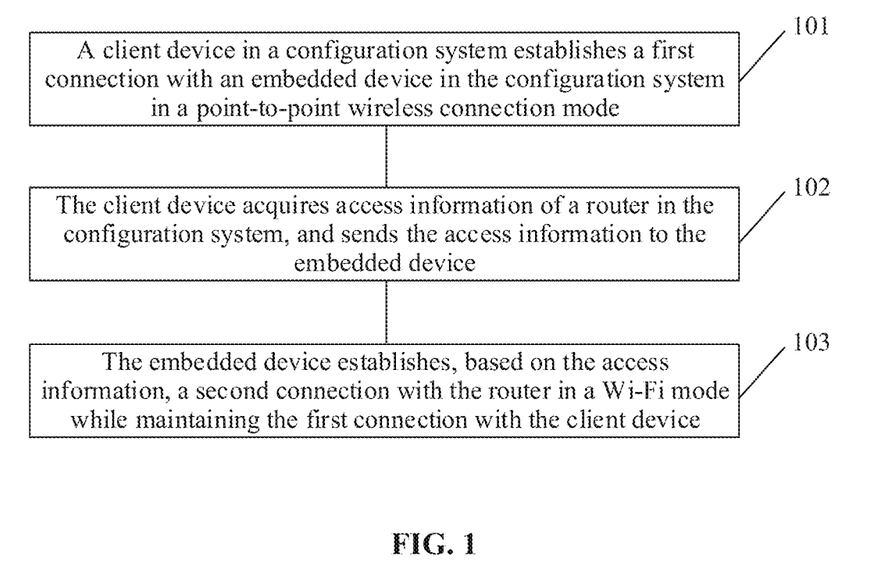
FIG. 1 illustrates a flowchart of a method for configuring an embedded device according to an embodiment of the disclosure.

A method for configuring an embedded device provided by the embodiments of the disclosure is applied in a configuration system including a client device, an embedded device and a router. As illustrated in FIG. 1, the method may include the following operations.

At S101, a client device in a configuration system establishes a first connection with an embedded device in the configuration system in the point-to-point wireless connection mode.

Here, the client device may be a mobile phone, a tablet PC, a PC, etc. The embedded device may be a Set Top Box (STP), a refrigerator, a smart television, etc.

Here, the first connection is a direct connection, namely a connection established between two devices without using a router. The point-to-point wireless connection mode may coexist with the Wi-Fi mode, that is, a device can establish a direct connection with another device in the point-to-point wireless connection mode, and can also establish a network connection with a router in the Wi-Fi mode. The point-to-point wireless connection mode may be a Wi-Fi Direct mode, a Bluetooth connection mode, a Near Field Communication (NFC) connection mode, and so on. Correspondingly, the client device and the embedded device may be configured with wireless communication modules in the same mode, so as to establish the first connection through their respective wireless communication modules.

In the following embodiments, the point-to-point wireless connection mode will be described in detail with the Wi-Fi Direct mode as an example.

In practical applications, the client device may establish the first connection with the embedded device in two manners.

The first manner is a manual connection manner. In the first manner, the client device enables a Wi-Fi Direct function, and searches all embedded devices around it; an interface of the client device displays identification information of all the embedded devices around it, namely the searched embedded devices; after a user clicks one piece of identification information on the interface to select the embedded device corresponding to the identification information, the client device may establish a Wi-Fi Direct connection with the embedded device according to a received selection instruction for the embedded device.

The second manner is an automatic connection manner. Generally, the identification information of the embedded device is printed or pasted on a surface of the device and/or a user manual; in addition, the embedded device may also be affixed with a QR code containing the identification information; therefore, the client device may acquire the identification information of the embedded device by scanning the QR code with a camera. Or, the embedded device may also be affixed with an NFC tag containing the identification information, and the client device may acquire the identification information of the embedded device by contacting the NFC tag closely through an NFC module. In this way, the client device may acquire the identification information of the corresponding embedded device through automatic scanning, so that a Wi-Fi Direct connection can be established with the embedded device without manual selection.

It should be noted that the identification information of the embedded device may include information such as the name and physical address (namely an MAC address) of the embedded device.

At S102, the client device acquires access information of a router in the configuration system, and sends the access information to the embedded device.

Here, the router is mainly a wireless router, and the access information of the router may include an SSID, an MAC address, a frequency band, a channel, an encryption mode, and so on. In a case that the router is encrypted, the access information may also contain a connection password.

Specifically, the client device may acquire the access information in two manners.

The first manner is a manual acquiring manner. In the first manner, while maintaining the Wi-Fi Direct connection with the embedded device, the client device scans and displays on the interface, through corresponding configuration software, identification information of all the routers in the current environment, and may also display the access information of the router. Based on the displayed identification information, the router to be connected may be selected by a user. If the router operates in an encrypted mode, the user enters the corresponding password; correspondingly, the client device may acquire the access information according to a received operation instruction for the router.

The second manner is an automatic acquiring manner. In the second manner, the client device scans the QR code containing the identification information of the router through the camera or contacts the NFC tag containing the identification information of the router closely through the NFC module, and establishes the Wi-Fi Direct connection with the router. After establishing the Wi-Fi Direct connection, the client device receives an agreement message containing a password, which is sent by the router while allowing to access, and then acquires the access information of the router. In this way, the client device may establish the Wi-Fi Direct connection with the router through automatic scanning to obtain the access information of the router, and then the user may acquire the access information without manual selection.

Here, the identification information of the router may include the SSID, the MAC address and other information of the router.

It should be noted that if the automatic acquiring manner is adopted, since the client device needs to maintain the Wi-Fi Direct connection established with the embedded device, during establishing Wi-Fi Direct connection with the router, the client device is required to act as a group owner, and the embedded device and the router act as group clients. That is, the client device, the embedded device and the router are all in the group of unified Wi-Fi Direct, the client device is the group owner, and the embedded device and the router are the group clients, so that the client device may establish the Wi-Fi Direct connection with multiple devices at the same time.

In practical applications, which device is the group owner may be determined by setting willingness values, of acting as the group owner, of the client device, the embedded device and the router. Specifically, the larger the willingness value of acting as the group owner of which device, the device is the group owner; for example, the willingness value of acting as the group owner of the client device may be preset greater than that of the embedded device and the router, so the client device acts as the group owner, and the embedded device and the router act as the group client in the configuration system.

Furthermore, because the client device has two manners to acquire the access information, for each acquiring manner, the client device may send the acquired access information to the embedded device in a corresponding manner.

Specifically, when the access information is acquired in the manual acquiring manner, the client device directly sends the access information of the router selected by the user to the embedded device through a Wi-Fi Direct channel.

When the access information is acquired in the automatic acquiring manner, the corresponding configuration software of the client device informs the router of device name, device type, MAC address and other information of the embedded device through the Wi-Fi Direct connection established with the router, so as to request whether the embedded device is allowed to access the router. If the router determines, according to rules such as security guidelines and service logic, that the embedded device is allowed to access, the router replies an agreement message containing a password to the client device through the Wi-Fi Direct connection; or else, the router replies a reject message. When the router allows the embedded device to access, the client device sends the access information of the router to the embedded device through the Wi-Fi Direct connection established with the embedded device.

At S103, the embedded device establishes, based on the access information, a second connection with the router in the Wi-Fi mode while maintaining the first connection with the client device.

Here, the embedded device may access the corresponding router in the Station mode while maintaining the Wi-Fi Direct connection with the client device.

Moreover, in the process of accessing the corresponding router, the embedded device may feed back the progress of accessing the router to the client device in real time through the Wi-Fi Direct connection established with the client device, and feed back the result of accessing the router when the accessing ends. Correspondingly, the client device may feed back the access result and the access progress to the user in real time in the form of progress bar, so that the user may obtain access process information and feedback information about networking success or failure of the embedded device.

It is understandable that when the client device acts as the group owner, the configuration system may include multiple embedded devices, all of which act as the group clients in the configuration system.

In the configuration system including multiple embedded devices, the specific implementation process of the configuration of the embedded device is as follows.

Firstly, the client device establishes a Wi-Fi Direct connection with each of these embedded devices.

Then, after the connection is established, when the access information of the router is acquired manually, the client device directly sends the access information of the router to each of the embedded devices. When the access information of the router is acquired in the automatic acquiring manner, the client device informs the router of the identification information of the embedded device that has established the first connection. If the router determines, according to rules such as a security guidelines and a service logic, that a part or all of the embedded devices are allowed to access, then the router replies the agreement message containing an identification information list of target embedded devices allowed to access and a password to the client device through the Wi-Fi Direct connection established with the client device; or else, the router replies the reject message. Correspondingly, after receiving the agreement message, the client device send the access information of the router to each of the target embedded devices corresponding to identification information in the identification information list through a respective Wi-Fi Direct connection.

Finally, each of the embedded devices accesses the router in the Station mode while maintaining the Wi-Fi Direct connection with the client device. Thus, the problem that the traditional configuration scheme cannot realize batch configuration of multiple embedded devices is fundamentally solved.

To sum up, in the embodiments of the disclosure, by combining the Wi-Fi configuration mode with the point-to-point wireless connection mode, the embedded device may establish the second connection with the router in the Wi-Fi mode while establishing the first connection with the client device in the point-to-point wireless connection mode, so that the embedded device has no need to switch from the AP mode to the Station mode in the configuration process, which can greatly shorten the configuration time of the embedded device and improve the configuration speed and efficiency.

Because the embedded device still maintains the first connection with the client device while establishing the second connection with the router, the client device may also receive the progress and result of accessing the router fed back from the embedded device.

The client device may be connected to the embedded device and the router in a point-to-point connection mode by automatic scanning, which is highly automated, fast, convenient, simple and efficient. In addition, by establishing the connection with the router in the point-to-point connection mode, the client device may quickly transfer the identification information of the embedded device allowed to access and the password, thus realizing automated configuration that requires no manual input and selection by the user.

Moreover, the configuration system may include multiple embedded devices. In the configuration system, the client device acts as the group owner, and the multiple embedded devices and the router act as the group clients, thus fundamentally solving the problem that the traditional configuration scheme cannot realize batch configuration of multiple embedded devices.

The disclosure is further described in detail in combination with several application embodiments.

First Application Embodiment

The application embodiment is an application scenario where the user manually selects a router and enters a password to configure an embedded device. In the application scenario, the configuration system includes a client device, an embedded device and a router. The point-to-point connection established between the client device and the embedded device and the point-to-point connection established between the client device and the router are Wi-Fi Direct connections.

The specific implementation process of configuration of the embedded device in the application scenario is described in detail below.

Figure 2:
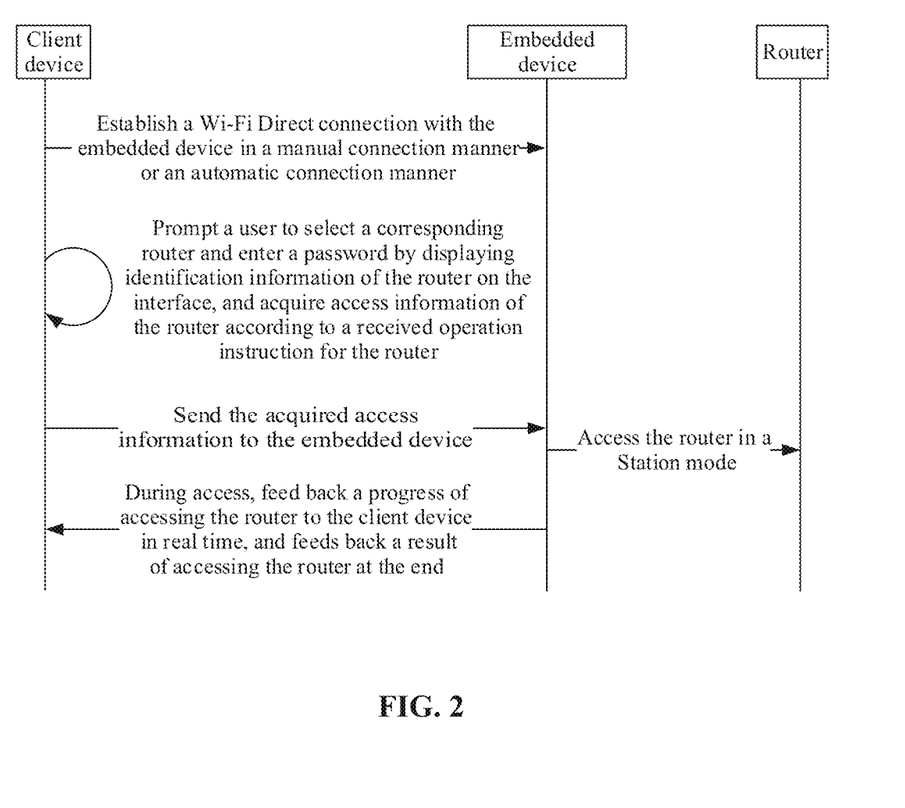
FIG. 2 illustrates an implementation diagram of a method for configuring an embedded device according to a first application embodiment of the disclosure.

As illustrated in FIG. 2, the client device establishes a Wi-Fi Direct connection with the embedded device in the manual connection manner or the automatic connection manner.

The client device prompts the user to select the corresponding router and enter the password by displaying the identification information of the router on the interface, and acquires the access information of the router according to a received operation instruction for the router.

The client device sends the acquired access information to the embedded device.

The embedded device accesses the router in the Station mode.

During access, the embedded device feeds back the progress of accessing the router to the client device in real time, and feeds back the result of accessing the router when the accessing ends.

Second Application Embodiment

The application embodiment is an application scenario in which an embedded device is configured automatically according to the QR code or the NFC tag containing the identification information of the router. In the application scenario, the configuration system includes a client device, an embedded device and a router. The point-to-point connection established between the client device and the embedded device and the point-to-point connection established between the client device and the router are Wi-Fi Direct connections. In the configuration system, the client device is the group owner, and the embedded device and router are the group clients.

The specific implementation process of configuration of the embedded device in the application scenario is described in detail below.

Figure 3:
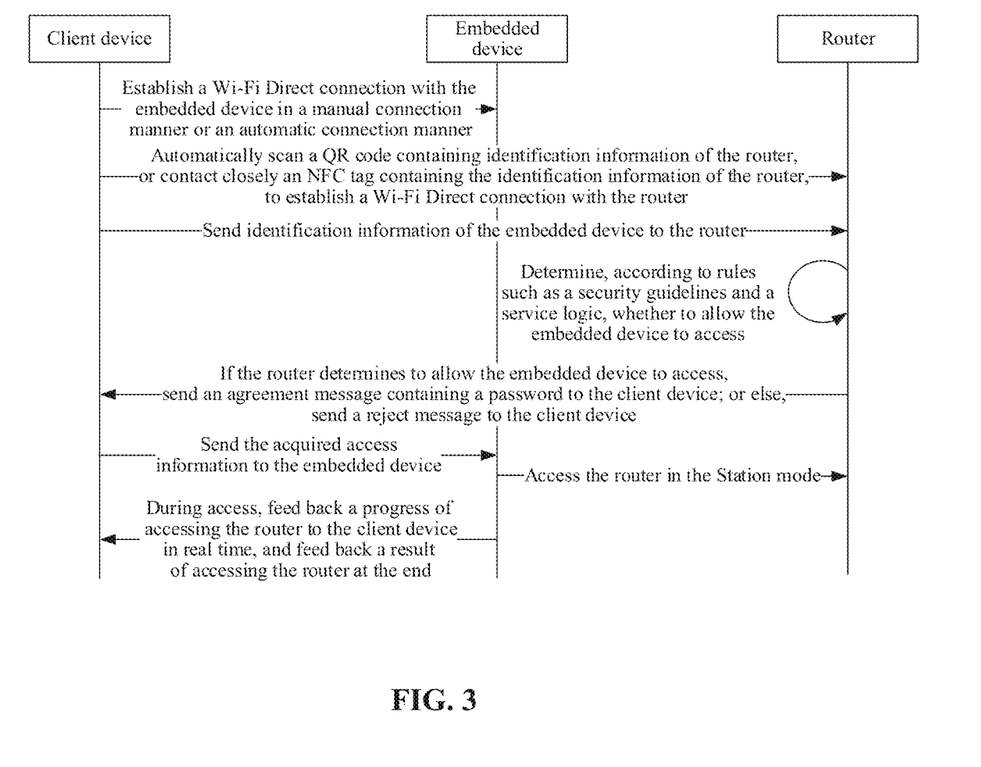
FIG. 3 illustrates an implementation diagram of a method for configuring an embedded device according to a second application embodiment of the disclosure.

As illustrated in FIG. 3, the client device establishes a Wi-Fi Direct connection with the embedded device in the manual connection manner or the automatic connection manner.

The client device automatically scans the QR code containing the identification information of the router, or contacts closely the NFC tag containing the identification information of the router, to establish a Wi-Fi Direct connection with the router.

The client device sends the identification information of the embedded device to the router.

The router determines, according to rules such as a security guidelines and a service logic, whether to allow the embedded device to access.

If the router determine to allow the embedded device to access, the router sends an agreement message containing a password to the client device; or else, the router sends a reject message to the client device.

The client device sends the acquired access information to the embedded device.

The access information contains the connection password of the router.

The embedded device accesses the router in the Station mode.

During access, the embedded device feeds back the progress of accessing the router to the client device in real time, and feeds back the result of accessing the router when the accessing ends.

Third Application Embodiment

The application embodiment is an application scenario in which the user manually selects the router and enters the password to perform batch configuration of multiple embedded devices. In the application scenario, the configuration system includes a client device, at least two embedded devices, and a router. The point-to-point connection established between the client device and each of the embedded devices and the point-to-point connection established between the client device and the router are Wi-Fi Direct connections. In the configuration system, the client device is the group owner, and the embedded devices and the router are the group clients.

The specific implementation process of configuration of the embedded devices in the application scenario is described in detail below.

Figure 4:
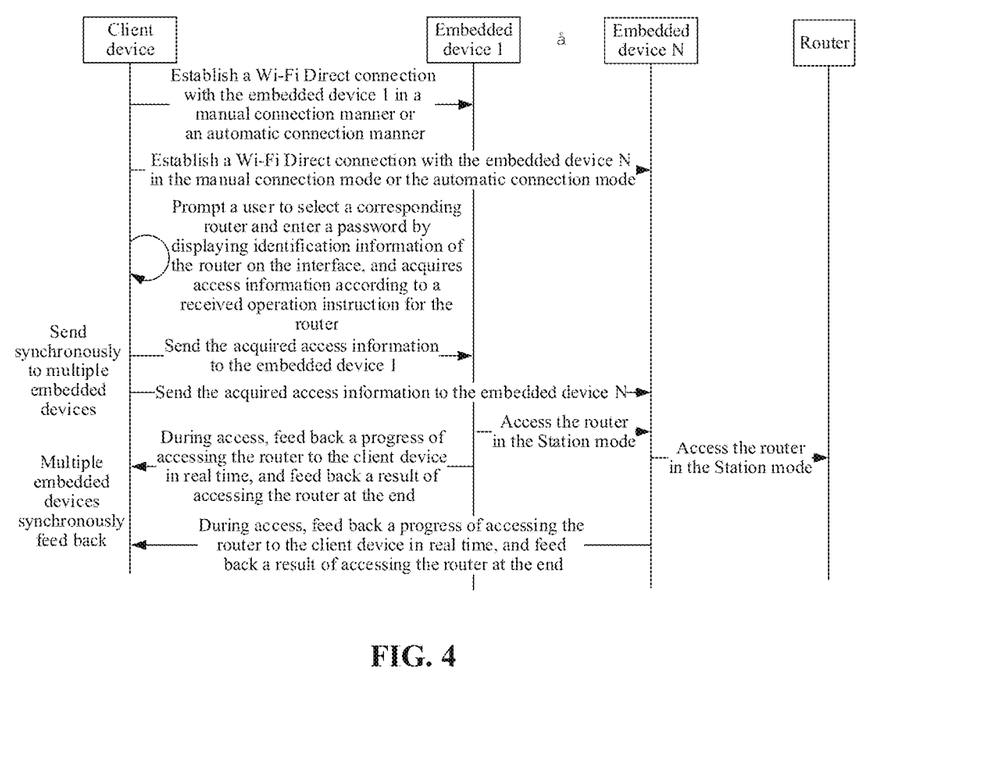
FIG. 4 illustrates an implementation diagram of a method for configuring an embedded device according to a third application embodiment of the disclosure.

As illustrated in FIG. 4, the client device establishes a Wi-Fi Direct connection with each of the embedded devices in the manual connection manner or the automatic connection manner.

The client device prompts the user to select the corresponding router and enter the password by displaying the identification information of the router on the interface, and acquires the access information according to a received operation instruction for the router.

The client device sends the acquired access information to the each of the embedded devices.

The each of the embedded devices accesses the router in the Station mode.

During access, the each of the embedded devices feeds back a respective progress of accessing the router to the client device in real time, and feeds back a respective result of accessing the router when the accessing ends.

Fourth Application Embodiment

The application embodiment is an application scenario in which the batch configuration of multiple embedded devices is performed automatically according to the QR code or the NFC tag containing the identification information of the router. In the application scenario, the configuration system includes a client device, at least two embedded devices, and a router. The point-to-point connection established between the client device and each of the embedded devices and the point-to-point connection established between the client device and the router are Wi-Fi Direct connections. In the configuration system, the client device is the group owner, and the embedded devices and the router are the group clients.

The specific implementation process of configuration of the embedded devices in the application scenario is described in detail below.

Figure 5:
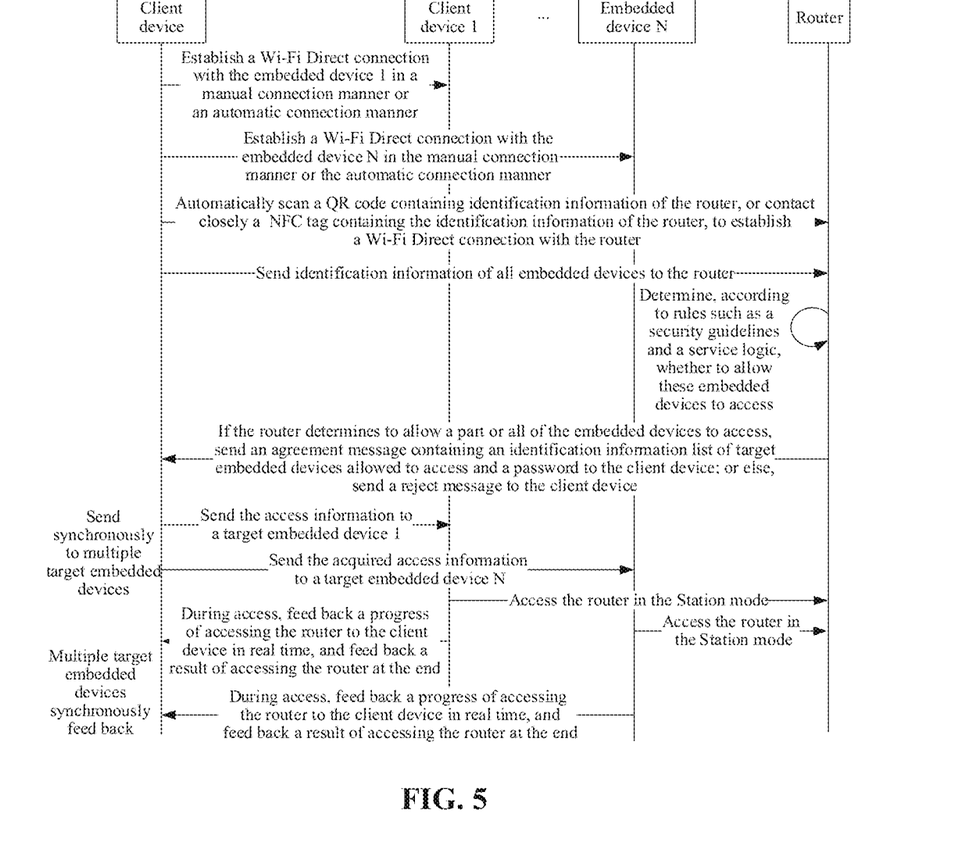
FIG. 5 illustrates an implementation diagram of a method for configuring an embedded device according to a fourth application embodiment of the disclosure.

As illustrated in FIG. 5, the client device establishes a Wi-Fi Direct connection with each of the embedded devices in the manual connection manner or the automatic connection manner.

The client device automatically scans the QR code containing the identification information of the router, or contacts closely the NFC tag containing the identification information of the router, to establish a Wi-Fi Direct connection with the router.

The client device sends identification information of each of the embedded devices to the router.

The router determines, according to rules such as a security guidelines and a service logic, whether to allow these embedded devices to access.

If the router determines that a part or all of the embedded devices are allowed to access, the router sends an agreement message containing an identification information list of target embedded devices allowed to access and a password to the client device; or else, the router sends a reject message to the client device.

The client device sends the acquired access information to each of the target embedded devices corresponding to identification information in the identification information list.

The access information contains the connection password of the router.

The each of the embedded devices accesses the router in the Station mode.

During access, each of the target embedded device feeds back a respective progress of accessing the router to the client device in real time, and feeds back a respective result of accessing the router when the accessing ends.

A configuration system is also provided to implement the method of the embodiments of the disclosure. The configuration system includes: a client device, an embedded device, and a router.

The client device is configured to establish a first connection with the embedded device in the point-to-point wireless connection mode, acquire access information of the router, and send the access information to the embedded device.

The embedded device is configured to establish, based on the access information, a second connection with the router through Wi-Fi while the first connection with the client device is maintained.

In an embodiment, the embedded device is further configured to feed back the progress of accessing the router to the client device in real time, and feed back the result of accessing the router when the accessing ends.

In an embodiment, the client device is specifically configured to: establish, according to the received selection instruction for the embedded device, the first connection with the selected embedded device in the point-to-point wireless connection mode; or, acquire the identification information of the embedded device, and establish, based on the identification information of the embedded device, the first connection with the corresponding embedded device in the point-to-point wireless connection mode.

In an embodiment, the client device is specifically configured to acquire the access information according to the received operation instruction for the router.

In an embodiment, the client device is specifically configured to: acquire the identification information of the router; establish, based the identification information of the router, a third connection with the router in the point-to-point wireless connection mode while maintaining the first connection with the embedded device; and if the router allows the embedded device corresponding to the identification information sent by the client device to access, receive the access information from the router.

In an embodiment, the router is configured to determine whether to allow the embedded device corresponding to the identification information sent by the client device to access, and when determining to allow a target embedded device to access, send identification information of the target embedded device to the client device. The target embedded device is an embedded device, among the embedded devices corresponding to the identification information sent by the client device, which is allowed to access.

The client device is specifically configured to receive the identification information of the target embedded device from the router, and send the access information to the corresponding target embedded device according to the identification information of the target embedded device.

The target embedded device is configured to establish, based on the access information, the second connection with the router in the Wi-Fi mode while maintaining the first connection with the client device.

Optionally, when the point-to-point wireless connection mode is a Wi-Fi Direct mode or a Bluetooth connection mode, the configuration system may include multiple embedded devices. In the configuration system, the client device is the group owner, and the embedded devices and the router are the group clients.

According to the above description, for the client device, the client device establishes the first connection with the embedded device in the point-to-point wireless connection mode; the client device acquires the access information of the router in the configuration system; and the client device sends the access information to the embedded device. The access information is used for instructing the embedded device to establish the second connection with the router in the Wi-Fi mode while maintaining the first connection with the client device. The specific implementation of each step is the same as described above and will not be repeated here.

Figure 6:
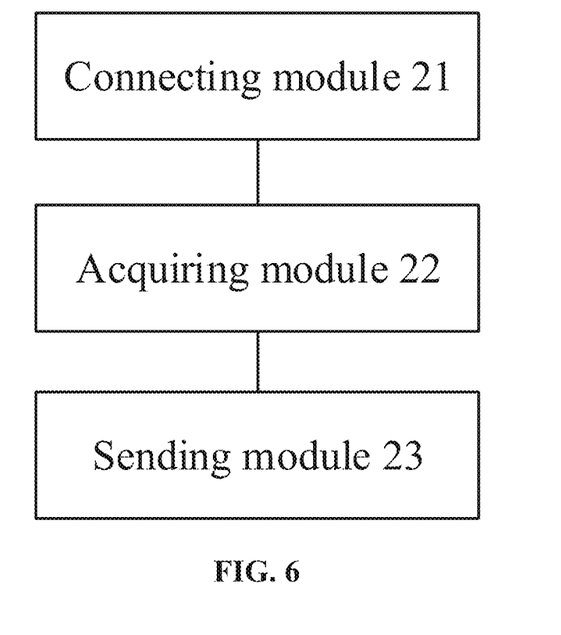
FIG. 6 illustrates a structure diagram of a client device according to an embodiment of the disclosure.

A client device is also provided to implement a method for configuring an embedded device in the embodiments of the disclosure. FIG. 6 illustrates a structure diagram of the client device according to an embodiment of the disclosure. As illustrated in FIG. 6, the client device of the present embodiment includes: a connecting module 21, an acquiring module 22 and a sending module 23.

The connecting module 21 is configured to establish a first connection with an embedded device in the point-to-point wireless connection mode.

The acquiring module 22 is configured to acquire access information of a router.

The sending module 23 is configured to send the access information to the embedded device. The access information is used for instructing the embedded device to establish the second connection with the router in the Wi-Fi mode while maintaining the first connection with the client device.

In an embodiment, the connecting module 21 is specifically configured to: establish, according to a received selection instruction for an embedded device, a first connection with the selected embedded device in the point-to-point wireless connection mode; or, acquire identification information of an embedded device, and establish, according to the identification information of the embedded device, a first connection with the corresponding embedded device in the point-to-point wireless connection mode.

In an embodiment, the acquiring module 22 is specifically configured to acquire the access information according to a received operation instruction for the router.

In an embodiment, the acquiring module 22 is specifically configured to: acquire identification information of the router; establish, according to the identification information of the router, a third connection with the router in the point-to-point wireless connection mode while maintaining the first connection with the embedded device; and if the router allows an embedded device corresponding to identification information sent by the client device to access, receive the access information from the router.

In an embodiment, the sending module 23 is specifically configured to: when the router allows embedded devices corresponding to identification information sent by the client device to access, send, according to identification information of a target embedded device sent by the router, the access information to the corresponding target embedded device, so that the access information instructs the target embedded device to establish the second connection with the router in the Wi-Fi mode while maintaining the first connection with the client device.

In practical applications, all the connecting module 21, the acquiring module 22 and the sending module 23 may be realized by a processor in the client device combined with a user interface.

When the embedded device is configured, the client device provided by the above embodiments is illustrated only by the division of each program module mentioned above. In practical applications, the above processing may be assigned to different program modules to complete according to needs, that is, the internal structure of the client device is divided into different program modules to complete all or part of the processing described above.

Figure 7:
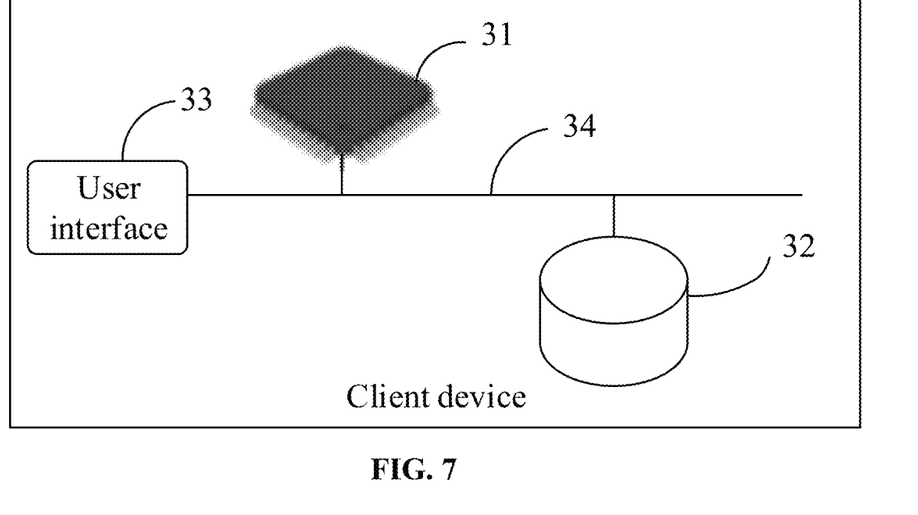
FIG. 7 illustrates a hardware structural diagram of a client device according to an embodiment of the disclosure.

The embodiments of the disclosure also provide a client device. FIG. 7 illustrates a hardware structure diagram of the client device according to an embodiment of the disclosure. As illustrated in FIG. 7, the client device of the embodiment includes: a processor 31, a memory storing a computer program executable by the processor 31, and a user interface 33.

The user interface 33 is configured to receive an operation instruction from a user.

When running the computer program, the processor 31 is configured to perform the following operations.

A first connection is established with an embedded device in a point-to-point wireless connection mode.

Access information of a router is acquired.

The access information is sent to an embedded device. The access information is used for instructing the embedded device to establish a second connection with the router in a Wi-Fi mode while maintaining the first connection with the client device.

In an embodiment, when running the computer program, the processor 31 is further configured to perform the following operations.

According to a received selection instruction for the embedded device, a first connection is established with the selected embedded device in the point-to-point wireless connection mode; or identification information of an embedded device is acquired, and according to the identification information of the embedded device, the first connection is established with the corresponding embedded device in the point-to-point wireless connection mode.

In an embodiment, when running the computer program, the processor 31 is further configured to perform the following operation.

According to a received operation instruction for the router, the access information is acquired.

In an embodiment, when running the computer program, the processor 31 is further configured to perform the following operations.

Identification information of the router is acquired.

According to the identification information of the router, a third connection is established with the router in the point-to-point wireless connection mode while the first connection with the embedded device is maintained.

If the router allows an embedded device corresponding to identification information sent by the client device to access, the access information sent by the router is received.

In an embodiment, when running the computer program, the processor 31 is further configured to perform the following operation.

If the router allows embedded devices corresponding to identification information sent by the client device to access, according to identification information of a target embedded device sent by the router, the access information is sent to the corresponding target embedded device, so that the access information instructs the target embedded device to establish the second connection with the router in the Wi-Fi mode while maintaining the first connection with the client device.

Certainly, in practical applications, as illustrated in FIG. 7, all components are coupled together through a bus system 34. It may be understood that the bus system 34 is configured to implement connections and communications between these components. The bus system 34 includes a data bus and further includes a power bus, a control bus and a state signal bus. However, for clear description, various buses in FIG. 7 are marked as the bus system 34.

The above is only the preferred embodiments of the disclosure and not intended to limit the protection scope of the disclosure. Any modifications, equivalent replacements, improvements and the like within the spirit and scope of the disclosure should fall within the protection scope of the claims of the disclosure.

The invention claimed is:

1. A configuration system, comprising: a client device, at least one embedded device, and a router, wherein
the client device is configured to:
establish a first connection with the at least one embedded device in a point-to-point wireless connection mode;
acquire identification information of the router by scanning or contacting closely;
establish, based on the identification information of the router, a third connection with the router in the point-to-point wireless connection mode while maintaining the first connection with the at least one embedded device;
send identification information of the at least one embedded device that has established the first connection with the client device to the router;
receive access information of the router from the router, wherein the access information comprises an identification information of an embedded device in the at least one embedded device allowed to access; and
send the access information to the embedded device corresponding to the identification information; and
the at least one embedded device is configured to establish, upon receiving the access information, a second connection with the router in a Wireless Fidelity (Wi-Fi) mode based on the access information while maintaining the first connection with the client device.

2. The system of claim 1, wherein the at least one embedded device is further configured to:
feed back a progress of accessing the router to the client device in real time; and
feed back a result of accessing the router when the accessing ends.

3. The system of claim 1, wherein the client device is configured to:
establish, according to a received selection instruction for an embedded device in the at least one embedded device, a first connection with the selected embedded device in the point-to-point wireless connection mode; or,
acquire identification information of an embedded device in the at least one embedded device, and establish, based on the identification information of the embedded device, a first connection with the embedded device in the point-to-point wireless connection mode.

4. The system of claim 1, wherein the router is configured to:
determine whether to allow the at least one embedded device corresponding to the identification information sent by the client device to access, and
in response to determining to allow a target embedded device to access, send identification information of the target embedded device to the client device; wherein the target embedded device is one allowed to access among the at least one embedded device corresponding to the identification information sent by the client device;
the client device is configured to receive the identification information of the target embedded device from the router, and send the access information to the target embedded device based on the identification information of the target embedded device;
the target embedded device is configured to establish, based on the access information, the second connection with the router in the Wi-Fi mode while maintaining the first connection with the client device.

5. The system of claim 1, wherein when the point-to-point wireless connection mode comprises a Wi-Fi Direct mode or a Bluetooth connection mode, the configuration system comprises a plurality of embedded devices; wherein in the configuration system, the client device is a host device in a group, and the plurality of embedded devices and the router are client devices in the group.

6. A client device, comprising:
a processor; and
a memory storing a computer program executable by the processor;
wherein the processor, when executing the computer program, is configured to:
establish a first connection with at least one embedded device in a point-to-point wireless connection mode;
acquire identification information of a router by scanning or contacting closely;
establish, based on the identification information of the router, a third connection with the router in the point-to-point wireless connection mode while maintaining the first connection with the at least one embedded device;
send identification information of the at least one embedded device that has established the first connection with the client device to the router;
receive access information of the router from the router, wherein the access information comprises an identification information of an embedded device in the at least one embedded device allowed to access; and
send the access information to the embedded device corresponding to the identification information; wherein the access information is to instruct the embedded device to establish a second connection with the router in a Wireless Fidelity (Wi-Fi) mode while maintaining the first connection with the client device.

7. The client device of claim 6, wherein the processor, when running the computer program, is further configured to:
   establish, according to a received selection instruction for an embedded device in the at least one embedded device, a first connection with the selected embedded device in the point-to-point wireless connection mode; or
   acquire identification information of an embedded device in the at least one embedded device, and establish, based on the identification information of the embedded device, a first connection with the embedded device in the point-to-point wireless connection mode.

8. The client device of claim 6, wherein the processor, when running the computer program, is further configured to:
   when the router allows a target embedded device in the at least one embedded device corresponding to the identification information sent by the client device to access, send, according to identification information of the target embedded device sent by the router, the access information to the target embedded device, so that the access information instructs the target embedded device to establish the second connection with the router in the Wi-Fi mode while maintaining the first connection with the client device.

9. A method for configuring at least one embedded device, comprising:
   establishing, by a client device, a first connection with the at least one embedded device in a point-to-point wireless connection mode;
   acquiring identification information of a router by scanning or contacting closely;
   establishing, based on the identification information of the router, a third connection with the router in the point-to-point wireless connection mode while maintaining the first connection with the at least one embedded device;
   sending identification information of the at least one embedded device that has established the first connection with the client device to the router;
   receiving, by the client device, access information of the router from the router, wherein the access information comprises an identification information of an embedded device in the at least one embedded device allowed to access; and
   sending, by the client device, the access information to the embedded device corresponding to the identification information; wherein the access information is to instruct the embedded device to establish a second connection with the router in a Wireless Fidelity (Wi-Fi) mode while maintaining the first connection with the client device.

10. The method of claim 9, wherein the method further comprises:
    when the access information instructs the embedded device to establish the second connection with the router in the Wi-Fi mode while maintaining the first connection with the client device,
    feeding back, by the embedded device, a progress of accessing the router to the client device in real time, and feeding back, by the embedded device, a result of accessing the router when the accessing ends.

11. The method of claim 9, wherein establishing, by the client device, the first connection with the at least one embedded device in the point-to-point wireless connection mode comprises:
    establishing, by the client device, according to a received selection instruction for an embedded device in the at least one embedded device, a first connection with the selected embedded device in the point-to-point wireless connection mode; or
    acquiring, by the client device, identification information of an embedded device in the at least one embedded device, and establishing, based on the identification information of the embedded device, a first connection with the embedded device in the point-to-point wireless connection mode.

12. The method of claim 9, wherein the method further comprises:
    when the client device receives the access information from the router,
    receiving, by the client device, identification information of a target embedded device from the router, wherein the target embedded device is one determined by the router to be allowed to access among the at least one embedded device corresponding to the identification information sent by the client device;
    correspondingly, sending, by the client device, the access information to the embedded device corresponding to the identification information comprises:
    sending, by the client device, the access information to the target embedded device based on the identification information of the target embedded device, so that the access information instructs the target embedded device to establish the second connection with the router in the Wi-Fi mode while maintaining the first connection with the client device.

13. The method of claim 9, wherein when the point-to-point wireless connection mode comprises a Wi-Fi Direct mode or a Bluetooth connection mode, a configuration system comprises a plurality of embedded devices; wherein in the configuration system, the client device is a host device in a group, and the plurality of embedded devices and the router are client devices in the group.

14. A non-transitory computer-readable storage medium having stored therein computer-executable instructions that, when executed by a processor, cause the processor to perform the method for configuring the at least one embedded device of claim 9.

* * * * *